United States Patent [19]

Hoshino, deceased et al.

[11] Patent Number: 4,841,325
[45] Date of Patent: Jun. 20, 1989

[54] AUTOMATIC FOCUSING DEVICE FOR CAMERA

[75] Inventors: Kunihisa Hoshino, deceased, late of Tokyo, by Chie Hoshino, legal representative; Yoshinari Hamanishi, Tokyo; Ken Utagawa, Kawasaki, all of Japan

[73] Assignee: Nikon Corporation, Tokyo, Japan

[21] Appl. No.: 245,967

[22] Filed: Sep. 16, 1988

Related U.S. Application Data

[63] Continuation of Ser. No. 5,241, Jan. 20, 1987, abandoned.

[30] Foreign Application Priority Data

Jan. 22, 1986 [JP] Japan ................................. 61-12391

[51] Int. Cl.$^4$ .............................................. G03B 3/00
[52] U.S. Cl. ...................... 354/402; 354/400; 354/408; 354/286
[58] Field of Search ............... 354/400, 402, 406, 407, 354/408, 195.1, 286

[56] References Cited

U.S. PATENT DOCUMENTS 4,474,449 10/1984 Kusaka ................................ 354/408
4,509,846 4/1985 Nakai et al. ......................... 354/286
4,537,487 8/1985 Taniguchi et al. .................. 354/400
4,550,993 11/1985 Taniguchi et al. .................. 354/402

Primary Examiner—Russell E. Adams
Attorney, Agent, or Firm—Shapiro and Shapiro

[57] ABSTRACT

An automatic focusing device for use in camera lens systems comprises lens means such as a zoom lens for forming the image of an object, detecting means for detecting the amount of defocus of the image of the object formed by the lens means from a predetermined plane such as a film surface, memory means for storing at least one value of conversion coefficient and at least one value of correction coefficient which is used in a calculation for correcting the conversion coefficient, calculating means for correcting the conversion coefficient in accordance with the amount of defocus and the correction coefficient and for calculating the driving amount of at least a portion of the lens means on the basis of the corrected conversion coefficient and the amount of defocus, and lens driving means for driving at least a portion of the lens means, e.g., the front lens group of a zoom lens, in accordance with the driving amount calculated by the calculating means. Disclosed also a lens system, as well as a camera, incorporating this automatic focusing device.

17 Claims, 6 Drawing Sheets

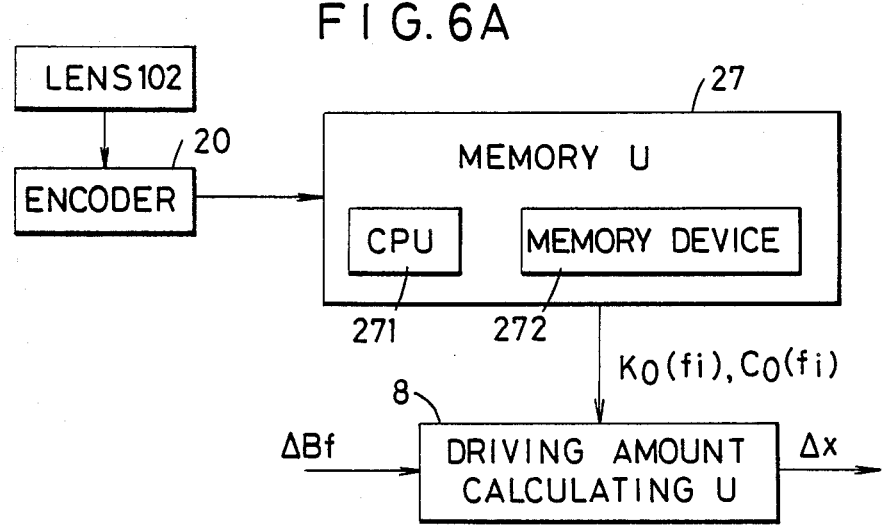
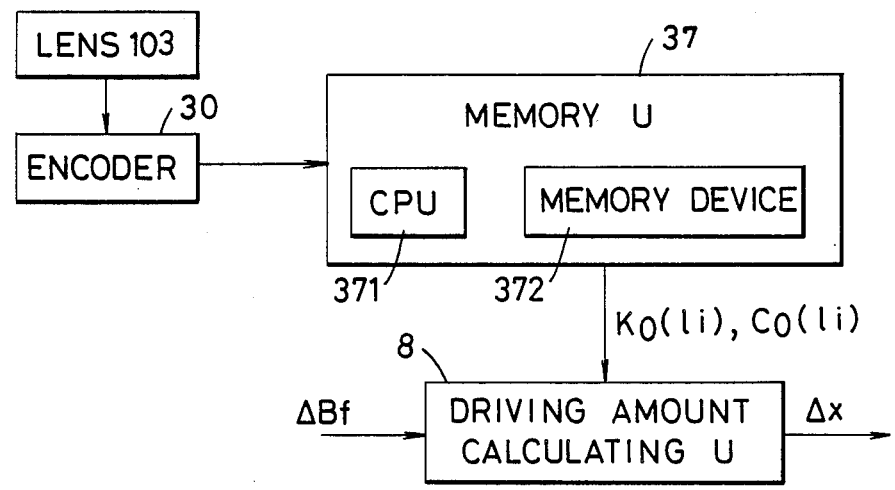

F I G.10
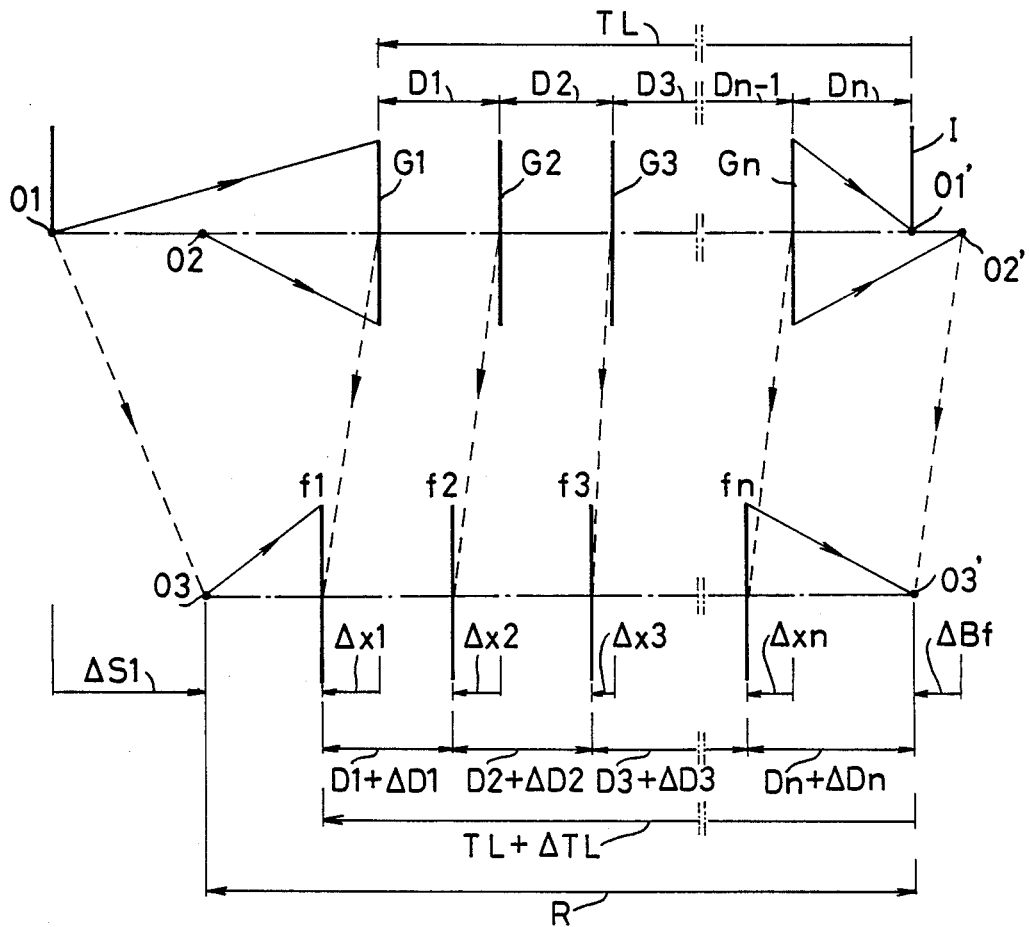

AUTOMATIC FOCUSING DEVICE FOR CAMERA

This is a continuation application of Ser. No. 005,241 filed Jan. 20, 1987, now abandoned.

BACKGROUND OF THE INVENTION

1. Field of the Invention

The present invention relates to an automatic focusing device for use in a camera, capable of performing automatic focusing through measuring the light coming through the shooting lens of the camera and determining the amount of defocus of the image-forming plane from a predetermined focal plane.

2. Related Background Art

A focus detecting system has been known in which the amount of deviation (referred to as defocus amount $\Delta Bf$) of the plane on which the image of an object is actually formed from a predetermined focal plane of the shooting lens system is detected by measuring the light coming through the shooting lens system. This type of focus detecting system, generally referred to as a TTL system, is used extensively in cameras having an automatic focusing function, in which lens driving means such as a motor is controlled in accordance with the defocus amount $\Delta Bf$, thus performing the automatic focusing operation.

The relationship between the amount $\Delta x$ of driving of the lens necessary for the focusing and the defocus amount $\Delta Bf$ is represented by the following formula (1).

$$\Delta x = 1/K \Delta Bf \quad (1)$$

where, K represents a coefficient which represents the relationship between the lens driving amount $\Delta x$ and the defocus amount $\Delta Bf$. This coefficient will be referred to as conversion coefficient K, hereinafter.

The conversion coefficient K varies depending on factors such as the focal distance of the lens, particularly the power arrangement of the lens system and the distance R which is the distance between the object point and the predetermined focal plane.

The distance R and the lens power arrangement are changed, respectively each time the object is changed and each time the lens assembly is changed. Therefore, the conversion coefficient K must be calculated each time the focusing operation is conducted and each time the lens assembly is changed. Actually, however, it is quite troublesome to conduct such a computation, because a voluminous computation has to be conducted for calculating the conversion coefficient K from the lens power arrangement and the distance R and because the distance R itself cannot be definitely obtained until the object is exactly focused on. Thus, it is very difficult to conduct such a calculation by a microprocessor or a similar computing means incorporated in the automatic focusing device. For these reasons, it has been a common measure to previously set the values of the conversion coefficient K.

To cope with these problems, in the case of an automatic focusing device in apparatus having interchangeable lenses, e.g., single-lens reflex cameras, each interchangeable lens is provided with its own conversion coefficient K which suits the property of the lens. In this regard, U.S. Pat. No. 4,509,842 discloses a zoom lens system in which the focal distance range is divided into a plurality of regions and a value of conversion coefficient K is set beforehand for each of the regions of the focal distance range. In conventional automatic focusing devices, the previously set value of the conversion coefficient K is applied to the formula 1 so that the lens driving amount $\Delta x$ is derived from formula (1) for each region of the focal distance range. Thus, in conventional systems, the conversion coefficient K given for each region of the focal distance range is a constant value. Actually, however, the value of the conversion coefficient K varies depending not only on the focal distance range but also on other factors. Thus, the conventional automatic focusing systems which rely upon constant values of the coefficient K in solving the formula (1) cannot provide a high degree of precision of the focusing operation.

The representation of the relationship between the defocus amount and the lens driving amount employing the constant value of the conversion coefficient K is extremely difficult particularly in lens systems of the type in which the focusing is effected by moving element lenses of a front lens group as in most zoom lens systems.

FIGS. 1A and 1B show the manner in which the value of the conversion coefficient K varies in accordance with changes in the distance R and the lens arrangement in a lens system in which the focusing operation is conducted by moving element lenses of a front group. More specifically, FIG. 1A shows by solid lines L light paths for a focusing lens 1a which is focused on infinity. Broken lines S in FIG. 1A show the defocus amount $\Delta Bf_1$ which is effected when an object O in a short distance is viewed through the focusing lens 1a in the state explained above. On the other hand, FIG. 1B shows by solid lines S light paths for the focusing lens 1a which is focused in the short distance. Broken lines L in FIG. 1B show the defocus amount $\Delta Bf_2$ which is effected when an object at infinity is viewed through the focusing lens 1a in the state explained above.

The lens driving amount necessary for focusing on the object O from the state shown in FIG. 1A and the lens driving amount necessary for focusing on the object at infinity from the state shown in FIG. 1B are as follows.

(a) from infinity to object O in short distance:
$+X_1$ (b) from object O to infinity:
$-X_2$ It will be seen that the defocus amounts in the states shown in FIG. 1A and FIG. 1B are different from each other as shown below, even though the absolute values of the lens driving amounts are equal.

$$|\Delta Bf_1| \neq |\Delta Bf_2|$$

In other words, the same defocus amount $|\Delta Bf|$ does not always provide the same lens driving amount $\Delta x$ necessary for focusing. This fact clearly shows that the value of the conversion coefficient K is not constant. Thus, the conventional automatic focusing device which relies upon an assumption that the conversion coefficient K is constant suffers from the following problems.

Namely, driving of the lens by the calculated lens driving amount $\Delta x$ may cause the lens to move beyond the focusing point or to stop before reaching the focusing point. It is thus impossible to position the lens correctly at the focusing point by a single cycle of focusing operation: namely, the object is correctly focused on only after several repeated cycles of the focusing operation, resulting in a too low focusing speed and intermittent non-smooth driving of the lens.

SUMMARY OF THE INVENTION

Accordingly, an object of the present invention is to overcome the above-described problems of the prior art.

The present invention provides, through a theoretical analysis of the relationship between the change in the value of the conversion coefficient K and the defocus amount ΔBf, an automatic focusing device which enables the lens driving amount Δx to be calculated with a high degree of precision, by correcting the value of the conversion coefficient K in accordance with the defocus amount ΔBf through a simple computation, as well as a lens system which can store the values of the conversion coefficient K together with correction data for correcting the values of the coefficient K.

BRIEF DESCRIPTION OF THE DRAWINGS

FIG. 6A is a block diagram showing the basic arrangement of a zoom lens system embodying the present invention;

FIG. 6B is a block diagram of a macro-lens system embodying the present invention;

FIG. 10 is an illustration of light paths showing the relationship between the lens driving amount and image plane moving amount in connection with the coupling coefficient in focusing of the lens system of the multi-group type.

DESCRIPTION OF THE PREFERRED EMBODIMENTS

A single-lens reflex camera having an automatic focusing device embodying the present invention will now be described.

Figure 2:
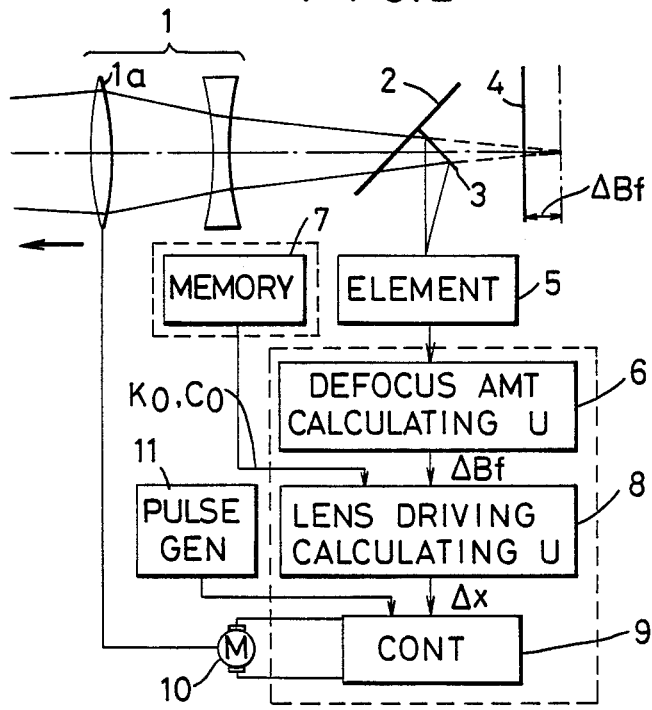
FIG. 2 is a block diagram showing the basic arrangement of constituents of an automatic focusing device in accordance with the present invention.

Referring to FIG. 2, the single-lens reflex camera has a shooting lens system which includes a focusing lens element 1a adapted to be driven in the direction of the optical axis by a lens driving motor 10. The light beam coming through the shooting lens system 1 is introduced to a detecting element 5 constituted by a CCD line image sensor, via a quick-return half mirror 2 and a sub mirror 3 which are mounted on the camera body. The output from the detecting element 5 is input to a defocus amount calculating unit 6 which calculates the defocus amount ΔBf of the image forming plane at which the object image is formed and a predetermined focal plane 4 which is, in this case, the film surface 4, together with the sign (+ or −) which indicates the direction of the defocusing. A reference numeral 7 designates a memory unit mounted in the shooting lens system 1 and constituted by various parts such as a lens ROM for storing information peculiar to the shooting lens system 1, a central processing unit CPU which reads the information, and a RAM for temporarily storing the information to be used. The memory unit 7 beforehand stores a conversion coefficient Ko and a correction coefficient Co for correcting the conversion coefficient Ko. These coefficients Ko and Co will be described later.

A lens driving amount calculating unit 8 is adapted to perform a calculation in accordance with the following formula (2) on the basis of the defocus amount ΔBf derived from the defocus amount calculating unit 6 and the coefficients Ko and Co which are read from the memory unit 7, thereby to determine the driving amount Δx necessary for the focusing lens element 1a.

$$\Delta x = \frac{1}{Ko(1 + Co \times \Delta Bf)} \times \Delta Bf \qquad (2)$$

In formula (2) above, the lens driving amount Δx takes a positive value when the shooting lens is extended in the direction of the optical axis, whereas the defocus amount ΔBf takes a positive value when the image forming plane is positioned behind the focal plate 4.

A lens driving controller 9 controls the focusing lens 1a through controlling the driving motor 10. This lens driving controller 9 has a counter which counts the number of pulses generated by a pulse generator 11, the number of the pulses being proportional to the distance travelled by the focusing lens 1a. The controller 9 operates to stop the motor 10 when the result of the counting has become equal to the lens driving amount Δx derived from the lens driving amount calculating unit 8.

The conversion coefficient Ko and the correction amount Co will be further described later. The invention will be outlined, by way of example, in connection with a zoom lens system of a front group moving type and another type of lens system, and then a theoretical explanation will be made to show that the invention is applicable to ordinary lens systems.

Figure 1:
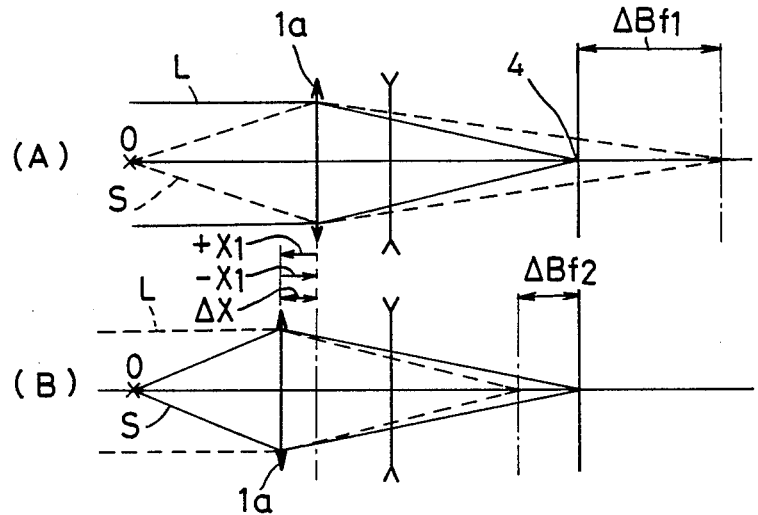
FIGS. 1A and 1B are illustrations of light paths in a known zoom lens system of front-group focusing type.
Figure 3:
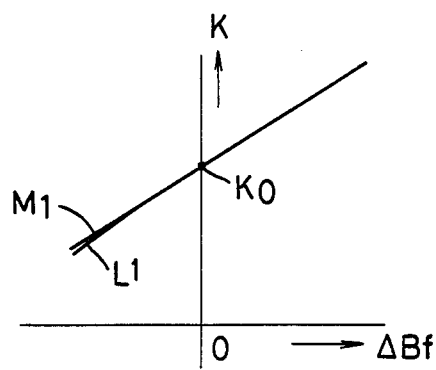
FIG. 3 is a graph showing a linear relationship between the conversion coefficient K and the defocus amount ΔBf, as well as a curve which approximates the linear relationship.

Table 1 and a curve L in FIG. 3 show the relationship between the conversion coefficient K and the defocus amount ΔBf as observed in the zoom lens system of a front group moving type having a lens arrangement shown in FIG. 1. FIG. 3 generally shows the relationship between the conversion coefficient K and the defocus amount ΔBf as observed in an intermediate object point distance range. In FIG. 3, the abscissa represents the position of the image-forming plane. The point O of origin indicates that an object is correctly focused, i.e., that the image forming plane coincides with the predetermined focal plane 4. The region expressed by ΔBf>0 corresponds to the state in which the image-forming plane on which the image of the object is actually formed is positioned behind the predetermined focal plane 4, while the region expressed by $\Delta Bf < 0$ corresponds to the state in which the image-forming plane is in front of the predetermined focal plane 4. A symbol $K_A$ represents the conversion coefficient K obtained in the focused state.

TABLE 1

| | Position of focusing lens | | |
|---|---|---|---|
| | Position for focusing on infinite distance | Position for focusing on intermediate distance | Position for focusing on closest point |
| Object distance | lens movement $x' = 0$ | lens movement $x' = 2.629$ | lens movement $x' = 5.579$ |
| infinite | | | |
| K | $K_{A1} =$ 1.065 | $K_{A4} =$ 0.988 | $K_{A7} =$ 0.915 |
| $\Delta Bf$ | 0.0 | −2.597 | −5.105 |
| $\Delta x$ | 0.0 | −2.629 | −5.579 |
| intermediate | | | |
| K | $K_{A2} =$ 1.151 | $K_{A5} =$ 1.062 | $K_{A8} =$ 0.977 |
| $\Delta Bf$ | 3.026 | 0.0 | −2.882 |
| $\Delta x$ | 2.629 | 0.0 | −2.950 |
| closet | | | |
| K | $K_{A3} =$ 1.256 | $K_{A6} =$ 1.151 | $K_{A9} =$ 1.052 |
| $\Delta Bf$ | 7.007 | 3.395 | 0.0 |
| $\Delta x$ | 5.579 | 2.950 | 0.0 |

As will be seen from FIG. 3, the curve L can be approximated by a straight line M1 which passes the point $K_A$ (Ko) at $\Delta Bf = 0$ and which has a gradient m, i.e., by a line which is expressed by the following formula (3).

$$K = m \cdot \Delta Bf + K_A \qquad (3)$$

The formula (3) can be rewritten as follows:

$$\begin{aligned} K &= m \cdot \Delta Bf + K_A \qquad (4) \\ &= K_A \left( \frac{m}{K_A} \cdot \Delta Bf + 1 \right) \\ &= Ko(Co \cdot \Delta Bf + 1) \\ &= K(\Delta Bf) \end{aligned}$$

where,
$Ko = K_A$, $Co = m/K_A$ and $K(\Delta Bf)$ represents the corrected conversion coefficient.

The corrected conversion coefficient $K(\Delta Bf)$ derived from the formula (4) is used in the formula (1), thus determining the lens driving amount $\Delta x$ optimum for the zoom lens system of the front group moving type.

$$\Delta x = \frac{1}{K(\Delta Bf)} \cdot \Delta Bf = \frac{1}{Ko(Co \cdot \Delta Bf + 1)} \times \Delta Bf \qquad (5)$$

Although the above-explained calculation makes use of the value Ko of the conversion coefficient obtained in the focused state, this is not exclusive and the invention does not exclude the use of, for example, a value $K_B$ obtained in the region of $\Delta Bf > 0$.

Referring now to Table 1, the values $K_{A1}$, $K_{A5}$ and $K_{A9}$ of the conversion coefficient obtained in the region near the focusing point are very close to one another. Thus, the value of the conversion coefficient Ko does not change significantly in the region near the focusing point, even though the object distance R is changed. Therefore, in this embodiment, the mean value of the values of the conversion coefficient Ko in the region near the focusing point or the maximum value of the same is stored as a representative value. It is, therefore, possible to effect the focusing operation by using this representative value Ko solely, regardless of the object distance R. The use of the maximum value as the representative value of the conversion coefficient Ko effectively prevents the focusing lens from over-running. The over-run of the focusing is preferably avoided for a reason which will be mentioned later.

The correction coefficient Co can be obtained by incorporating any desired value shown in Table 1 in the following formula (6) which is derived from the formula (2).

$$Co = \frac{1}{\Delta x \cdot Ko} - \frac{1}{\Delta Bf} \qquad (6)$$

For instance, when the object distance R is infinite so that the focusing lens is moved from a position focusing on the closest point to a position for focusing on the infinite distance point, the following conditions are met:
Ko = 1.065
Co = 0.0276

Conversely, the following conditions are met when the object is at the closest position, i.e., the object distance R is the smallest, so that the focusing lens is moved from the position focusing on the infinite distance point to the position focusing on the closest point.
Ko = 1.052
Co = 0.0277

Thus, the value of the correction coefficient and the fluctuation of the same are extremely small as compared with those of the conversion coefficient Ko. The influence of the error of the value Co is extremely small when the magnification $\beta$ is small, so that the conversion coefficient value $K(\Delta Bf)$ computed on the basis of the representative value is usable satisfactorily.

The lens driving amount $\Delta x$ derived from the formula (2) on the basis of the thus obtained conversion coefficient $K(\Delta Bf)$ involves an error on the order of 1% or so of the lens driving amount which is actually required. For instance, the lens can be moved to the focusing region by only one cycle of focusing operation, provided that the defocus amount $\Delta Bf$ is about 5 mm while the length of the focusing region is $\pm 50\mu$.

In contrast, in the case of the conventional automatic focusing device in which the conversion coefficient $K_A$ is directly used without correction by the correction coefficient Co and the defocus amount $\Delta Bf$, large errors on the order of several tens of percents are involved both focusing from closest point to infinite and focusing from infinite to the closest point, provided that the conversion coefficient $K_{A1} = 1.065$, obtained in the state of focusing on infinite distance point, is used as the representative value.

This fact will be realized from the following description of a practical example.

It is assumed here that the focusing lens is driven from a position for focusing on infinite distance point to a position for focusing on the closest point by using $K_{A9} = 1.052$ obtained at a position near the focusing position as the conversion coefficient K. In this case, the actual optimum conversion coefficient is $K_{A3} = 1.256$. Therefore, when the defocus amount $\Delta Bf$ is 7.007, the calculated lens driving amount and the actually required lens driving amount are respectively as follows.

Calculated value: $\Delta x = \frac{1}{K_{A9}} \cdot \Delta Bf = 6.661$

Actually required value: $\Delta x = \frac{1}{K_{A3}} \cdot \Delta Bf = 5.579$

Thus, the focusing operation from infinite to the closest point on the basis of the conversion coefficient $K_{A9}$ obtained in the region near the focusing point essentially causes an over-run of the lens.

The over-run may be avoided by the use of a large value of the conversion coefficient K. Assuming here that the maximum value $K=K_{A3}=1.256$ in Table 3 is used in the focusing operation from the closest point to the infinite distance point, since the optimum value of the conversion coefficient K is represented by $K_{A3}=1.256$, the calculated lens driving amount and the actually required lens driving amount for $\Delta Bf=-5.105$ are determined as follows:

Calculated value: $\Delta x = \frac{1}{K_{A3}} \cdot \Delta Bf = -4.064$

Actually required value: $\Delta x = \frac{1}{K_{A7}} \cdot \Delta Bf = -5.579$

Thus, the focusing operation from the closest point to the infinite distance point inevitably causes the calculated driving amount to be smaller than the required amount.

For this reason, the conventional automatic focusing device requires several focusing operation cycles until the focused state is obtained, due to the insufficient precision of the focusing operation.

Figure 4:
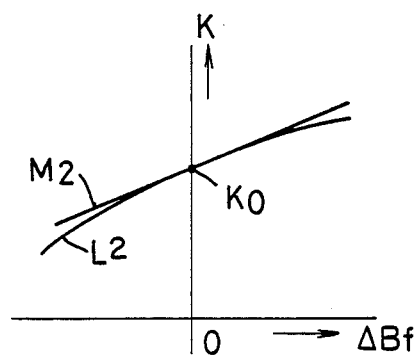
FIG. 4 is a graph showing a curvilinear relationship between the conversion coefficient K and the defocus amount ΔBf, as well as a curve which approximates the curvilinear relationship.

In some types of lens systems, such as those having short closest shooting distance or those employing a different focusing method, e.g., rear-focus and inner-focus type lenses, the conversion coefficient K does not always change linearly in relation to the change in the defocus amount $\Delta Bf$. Some of such lens systems exhibit a curvilinear relation as shown by a curve L2 in FIG. 4. It is, however, possible to determine the lens driving amount $\Delta x$ by a simple computation through a linear approximation of the curve L2 by a straight line M2 which is tangent to the curve L2 at the point $\Delta Bf=0$.

Figure 5:
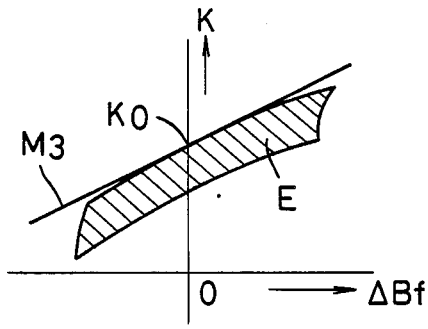
FIG. 5 is a graph showing a relationship between the conversion coefficient K and the defocus amount ΔBf, the relationship fluctuating within a certain range, as well as a curve which approximates the relationship.

In some lens systems, the relationship between the defocus amount $\Delta Bf$ and the conversion coefficient K fluctuates. FIG. 5 shows, by way of example, the characteristics of such a lens system. The region within which the relationship fluctuates is shown by the hatched area in FIG. 5. In this case, a straight line M3 is determined so as to plot the points of the conversion coefficient K which do not come under those in the fluctuating region, and the approximation is done by determining the conversion coefficient Ko and the correction coefficient Co in regard to this straight line M3. This approximating method also prevents over-run of the focusing lens as in the case of the method explained before in connection with FIG. 3.

The fluctuation in the relationship between the defocus amount $\Delta Bf$ and the conversion coefficient K in accordance with a change in the lens position typically takes place in zoom lens systems. In such lens systems having variable focal distance, there exists a certain relation between the values of the conversion coefficient Ko and the correction coefficient Co and the focal distance. The arrangement shown in FIG. 6A, therefore, is used suitably as the automatic focusing device for such zoom lens systems. In this case, the focal distance range is divided into a plurality of regions f1 to fN and a combination of the conversion coefficient Ko(fi) and the correction coefficient Co(fi) is set for each of the regions of focal distance. A zoom encoder 20 which is drivingly connected to the zoom ring of the lens 102 discriminates the present region of the focal distance range out of the plurality of regions f1 to fN. A CPU 271 of a memory unit 27 reads the values Ko(fi) and Co(fi) from a memory device 272 and delivers the same to the lens driving amount calculating unit 8. The zoom encoder 20 has, for example, a construction as discloses in U.S. Pat. No. 4,509,842.

An explanation will be made hereinunder as to the relationship between the focal distance and the conversion coefficient Ko. Representing the focal distance at the wide end by fw and the conversion coefficient corresponding to this focal distance by Ko (fw), the conversion coefficient Ko(f) at a set focal distance f is expressed by the following formula (7).

$$Ko(f)=(f/fw)^2 \times Ko(fw) \qquad (7)$$

The values of conversion coefficient Ko(f1) to Ko(fN) are obtained by using the focal distance values f1 to fN discriminated by the zoom encoder. Thus, the lens system is required to store (N+1) pieces of information: namely, Ko(fw) and Co(f1) to Co(fN). If all the information, i.e., Ko(f1) to Ko(fN) and Co(f1) to Co(fN), are to be stored, the number of pieces of information is 2N. Thus, in this embodiment, the number of pieces of information to be stored is reduced by the use of the encoder.

Lens systems used for the purpose of photographing at a very large magnification, such as a macro-lens system, experience large fluctuation in the conversion coefficient Ko and the correction coefficient Co depending on the photographing distance l. FIG. 6B shows an automatic focusing device which is suitable for use in such lens systems. In this case, the set photographing range is divided into regions li to lN and a combination of the conversion coefficient Ko(li) and the correction coefficient Co(li) is set for each of the regions. An object distance encoder 30 which is drivingly connected to the focusing ring of the lens 103 discriminates the present region of the object distance range out of the plurality of regions li to lN. A CPU 371 of a memory unit 37 reads the values Ko(li) and Co(li) from a memory device 372 and delivers the same to the lens driving amount calculating unit 8.

The lens driving amount $\Delta x$ shown in Table 1 represents the amount of displacement in the direction of the optical axis of the lens. This, however, is not exclusive and the amount $\Delta x$ may be the amount of control performed by the controller 9 and the motor 10. In such a case, the conversion coefficient K has to be determined such as to include the gear ratio or cam ratio of each lens. In this case also, however, the relationship between the conversion coefficient K and the defocus amount $\Delta Bf$ can be approximated by a simple formula, so that the invention can be applied also to this type of lens system equally well.

In the embodiments described hereinbefore, the lens driving amount $\Delta x$ is determined by a dividing computation. However, in the case where the use of a multiplying operation is more suitable, it is possible to use the following formula (8) in place of the formula (1).

$$\Delta x = Km \cdot (1 + Cm \times \Delta Bf) \qquad (8)$$

In the embodiments described hereinbefore, the change in the conversion coefficient K in relation to the lens driving amount $\Delta x$ is approximated by linear equations. However, when there are sufficiently large margins in the capacity of the memory unit and the calculation speed of the focus controller, the change in the conversion coefficient K may be approximated by an equation of a higher degree. For instance, the following formula (9) can be used for the purpose of approximation.

$$\Delta x = \frac{1}{K_o} \cdot \frac{\Delta Bf}{(1 + C1 \, \Delta Bf + C2 \, \Delta Bf^2)} \quad (9)$$

By using an equation of higher degree, it is possible to obtain a higher precision of focus control.

In the embodiments described hereinbefore, the conversion coefficient Ko and the correction coefficient Co are determined in such a manner as to prevent any over-run of the focusing lens. If it is necessary to employ a plurality of cycles of focusing operation until the focused condition is attained, it is preferred to design such that the over-run of the focusing lens is avoided in each of the repeated cycles of the focusing operation, i.e., such that the focusing lens progressively approaches the focusing position by repeated driving in the same direction. By adopting such a design, it is possible to eliminate various problems such as troubles caused by back lash in the lens driving mechanism and overload of the driving motor due to reversing which may be encountered when the design is such that the focusing lens over runs beyond the focusing position in the first cycle and is then returned in the next cycle. It will be clear that the lens driving operation conducted in such a manner as to eliminate any over-run of the focusing lens is advantageous both in design and operation.

In some lens systems, the focusing operation is conducted by moving a plurality of lens groups which have different patterns of movement. Such lens systems will be generally referred to as a multi-group focusing lens system, hereinunder. This type of lens system tends to require complicated information processing when the focusing operation is conducted automatically. The inventors, however, confirmed that the automatic focusing can be conducted even with the multi-group focusing lens system, by a calculating method basically the same as those explained in connection with the preceding embodiments.

Namely, an exact and prompt automatic focusing can be performed by detecting the defocus amount $\Delta Bf$ by means of a focus detecting device and determining the lens driving amount $\Delta x$ necessary for focusing on the object point through a computation in accordance with the following formula (10).

$$\Delta x = \frac{\Delta Bf}{K_o(1 + C_o \, \Delta Bf)} \quad (10)$$

where, Ko represents the image plane movement conversion coefficient and Co represents the correction coefficient.

A detailed description will be made hereinunder as to the relationship between the defocus amount $\Delta Bf$ and the amount of driving of each lens group necessary for obtaining focused condition in the multi-group focusing lens system.

For an easier understanding, an explanation will be made first as to the theory of a lens system in which the focusing is conducted by moving the lens system as a whole, and then the theory will be expanded to the case of a multi-group focusing lens system, typically a lens system having two groups of focusing lenses and adopting a small-distance correction system. Then, an explanation will be made as to the method for determining the lens driving amount of each lens group.

(a) In Case Where Whole Lens System is Moved As a Unit

Figure 7:
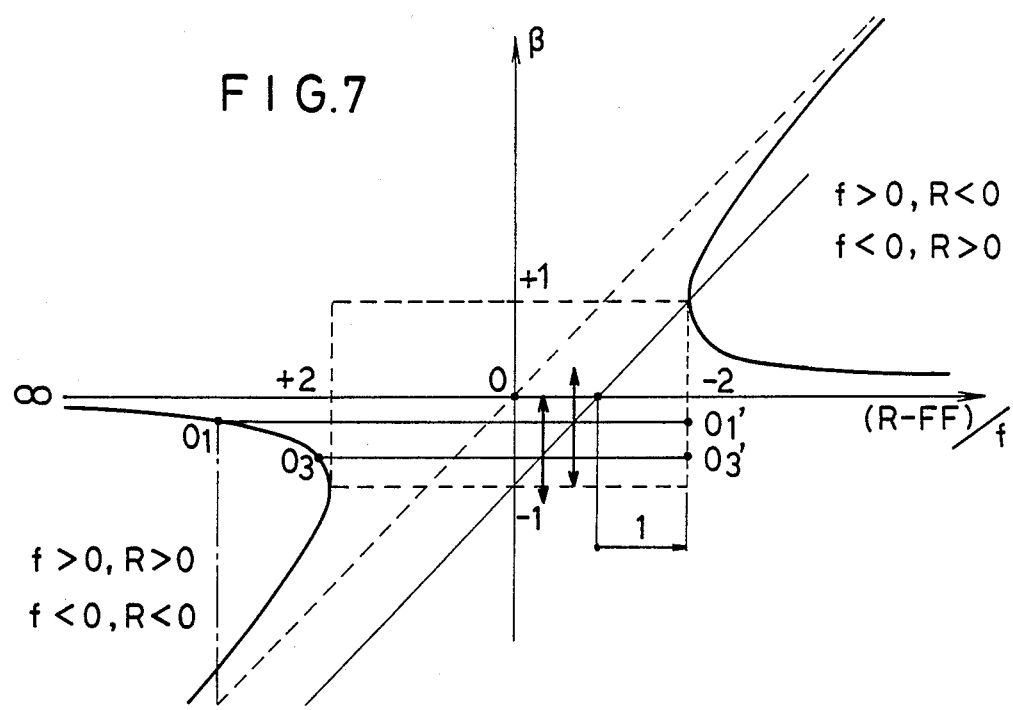
FIG. 7 is a diagram showing the relationship between magnification β and the shooting distance R as observed in the case where a lens system is focused on an object in a short distance by moving the lens system as a whole.

FIG. 7 shows, in order to explain the state of focusing, a relationship between the magnification $\beta$ of a single positive lens in close-focusing condition and the shooting distance R. This relationship is expressed by the following formula (11).

$$R = FF' - f(\beta + 1/\beta) \quad (11)$$

where, $\beta$ represents the magnification, f represents the synthetic focal distance of the lens system and FF' represents the distance between the front and the rear focal points. In order to facilitate the understanding of this relationship, FIG. 7 shows (R-FF')/f on the axis of the abscissa and $\beta$ on the axis of the ordinate. Since the lens is assumed to be a positive lens, the first quadrant and the third quadrant represent, respectively, a real image space and a virtual image space.

Figure 8:
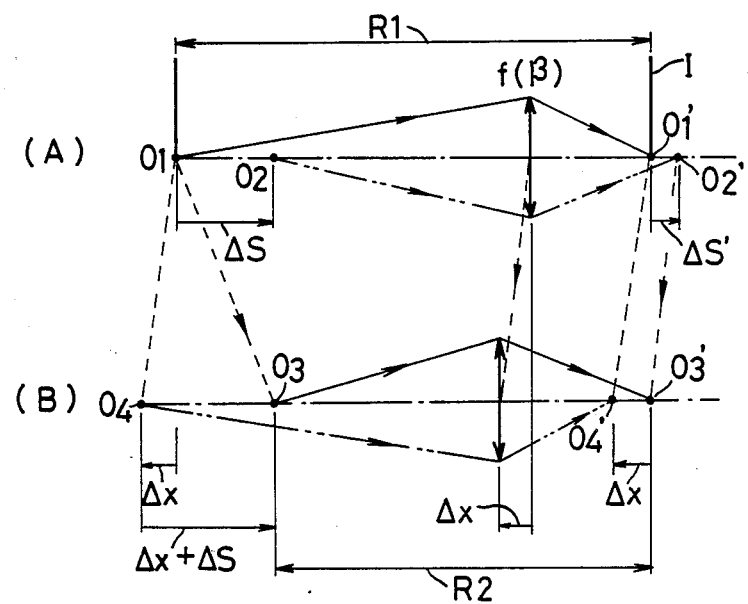
FIGS. 8A and 8B are illustrations of the light paths which represent the conjugate of the object point the cases where for definite shooting distances are $R_1$ and $R_2$ in the arrangement shown in FIG. 7.

FIGS. 8A and 8B correspond to the relationship shown in FIG. 7. More specifically, FIG. 8A schematically shows the path of light in the state in which the lens system is focused on an object point $O_1$ positioned at a distance $R_1$, particularly the conjugate relation between the object point $O_1$ and the image $O_1'$ thereof, as well as the conjugate relation between an object point $O_2$ which is out of focus and the image $O_2'$ thereof. FIG. 8B shows the state in which the lens system as a unit has been moved from the position shown in FIG. 8A by an amount $\Delta x$ so as to focus on a point $O_3$ which corresponds to the object point $O_2$. In this state, the distance between the object point $O_3$ and the image $O_3'$, i.e., the shooting distance, is $R_2$. In this state, the points $O_1$ and $O_1'$ which were focused in the state shown in FIG. 8A are out of focus as represented by points $O_4$ and $O_4'$, respectively.

In FIG. 8A, the shooting magnification $\beta$ is given by the following formula (12) in which $S_1$ represents the definite distance between the principal point H adjacent to the object and the object point $O_1$, while $S_1'$ represents the distance between the principal point H' adjacent to the image and the image point $O_1'$.

$$\beta = S_1'/S_1 \quad (12)$$

It is assumed here that the object point $O_1$ has been moved to $O_2$ by an amount $\Delta S$ with respect to the conjugate point of the object point $O_1$ and the image point $O_1'$ thereof and, as a result, the image point $O_1'$ is moved to $O_2'$ by an amount $\Delta S'$. In such a case, the following relationship is established between the moving amounts $\Delta S$ and $\Delta S'$.

$$\Delta S = \Delta S'/\beta^2(1 - \Delta S'/\beta f) \quad (13)$$

The movement of the object point causes defocusing of the points $O_1$, and $O_2$, with respect to the predetermined image plane I (film surface). In order to eliminate this defocusing, the lens is moved by an amount $\Delta x$ towards the object so as to focus $O_{2'}$ on $O_{3'}$. By replacing $\Delta S$ and $\Delta S'$ in the formula (13) by $\Delta S + \Delta x$ and $\Delta x$, respectively, in view of FIG. 8, the relationship between the amount $\Delta S$ of movement of the object point and the lens driving amount $\Delta x$ is determined as follows, $$\Delta S = \Delta x \left( \frac{1}{\beta^2(1 - \Delta x/\beta f)} - 1 \right) \quad (14)$$

The following formulae (15) and (16) are derived from the formulae (13) and (14).

$$\Delta x = \frac{(1 - \Delta x/f\beta)}{1 - \beta^2(1 - \Delta x/f\beta)} \cdot A \quad (15)$$

$$A \equiv \Delta S'/(1 - \Delta S'/f\beta)$$

$$\Delta x = \quad (16)$$

$$\frac{-f}{2\beta} \left( 1 - \beta^2 + \frac{A}{f\beta} \mp \sqrt{(1 - \beta^2 + A/f\beta)^2 + 4A\beta/f} \right)$$

Since the lens system is usually used in demagnifying mode, the value of the term in the root sign is negative, because the magnification $\beta$ is expressed by $-1 < \beta < 0$.

When the magnification is small, one of two following conditions is met, so that the formula (16) can be simplified as a following formula (17).

$$|\Delta x/f| << \left| \frac{1 - \beta^2}{\beta} \right|, \quad |4AB/f| << |1 - \beta^2 + A/f\beta|$$

$$\Delta x \approx \frac{1}{\gamma} \cdot \frac{\Delta S'}{(1 + \Delta S' \beta/\gamma f)} \quad (17)$$

where, $\gamma \equiv 1 - \beta^2$ \quad (18)

Thus, provided that the defocus amount $\Delta S'$ is detected, it is possible to determine the driving amount $\Delta x$ necessary for the lens system to focus the point $O_{2'}$ on the point $O_{3'}$, because the values $\gamma$, $\beta$ and f are given, whereby automatic focusing can be performed.

From a comparison between the formula (17) and the formula (1), it will be understood that the defocus amount $\Delta S'$ corresponds to the defocus amount $\Delta Bf$, while the product of the denominators $\gamma \times (1 + \Delta S'\beta/\gamma f)$ corresponds to the conversion coefficient K. A sufficiently high degree of focusing precision is obtainable even when the defocus amount $\Delta S'$ in formula (17) takes an appreciably large value.

(b) In Case of Focusing by Multi-Group Focusing Lens System

Figure 9:
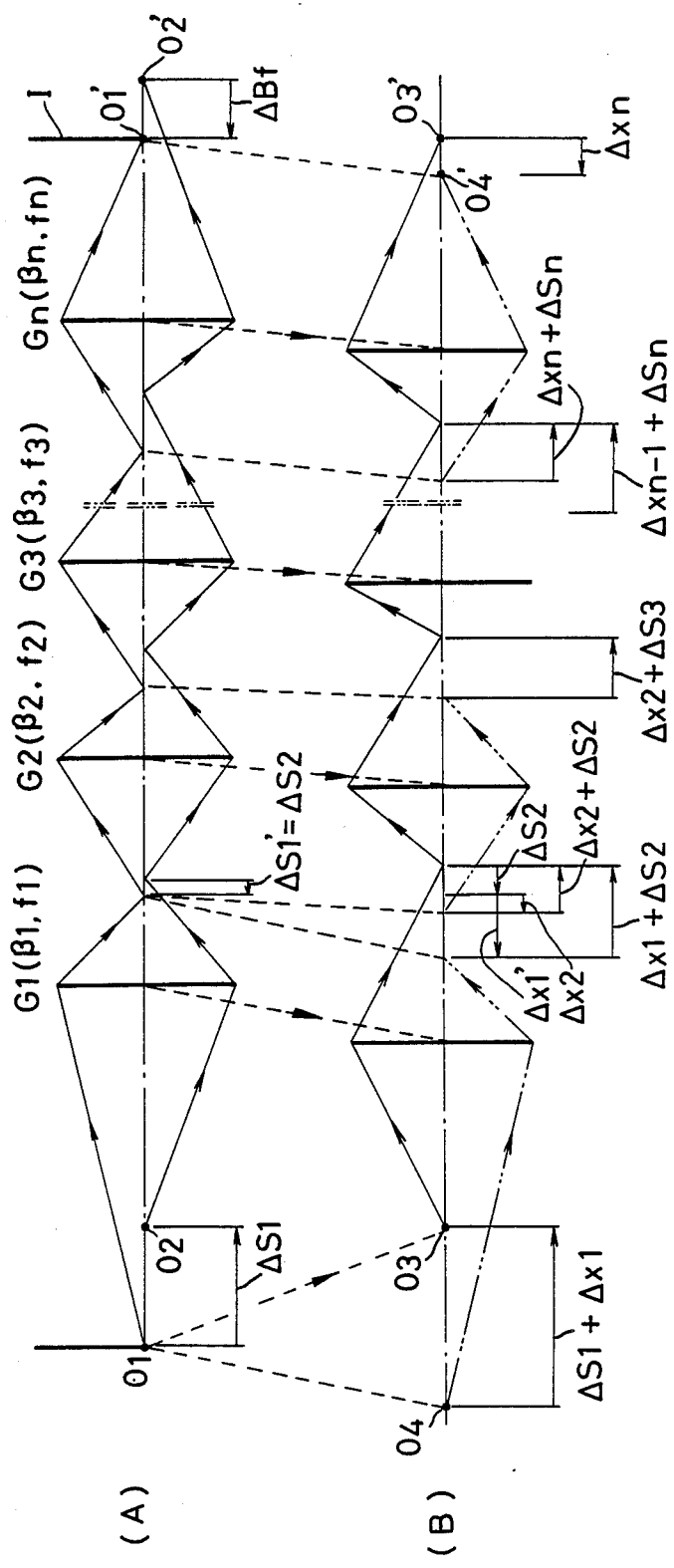
FIGS. 9A and 9B are illustrations of conjugate points of the objective points in focusing of a lens system of a multi-group type.

It is assumed here that the whole optical system is constituted by n groups of lenses, from a first lens group $G_1$ to n-th lens group $G_n$, as shown in FIGS. 9A and 9B. As in the cases of FIG. 8A, FIG. 9A shows the optical path in the state in which an object point $O_1$ at a shooting distance $R_1$ is focused, particularly the conjugate relation between the object point $O_1$ and its image $O_1'$, as well as conjugate relation between object point $O_2$ which is out of focus and its image $O_2'$. On the other hand, FIG. 9B shows the state in which the lens system as a unit has been moved by an amount $\Delta x$ from the state shown in FIG. 9A to focus on an object point $O_3$ which corresponds to the object point $O_2$. Due to the relationship explained in connection with FIG. 8B, the distance (shooting distance) between the object point $O_3$ and its image $O_3'$ is represented by $R_2$ and the object point $O_1$ which was focused on in the state shown in FIG. 9A is out of focus as indicated by $O_4$.

In case of the lens system having a plurality of lens groups, the image point of each one lens group constitutes the object point for the subsequent lens group so that the image is transmitted by successive lens groups so as to be formed on the final image plane I.

The shooting distance between a pair of conjugate points in the i-th lens group is represented here by $R_i$, and suffix i is attached to the data concerning each group. When none of the lens groups includes any afocal portion, i.e., when the conditions $\beta_i \neq 0$ and $R_i \neq \infty$ are met, the formulae (11) to (18) explained before are transformed so as to determine the relations in multi-group lens system.

The shooting distance R and the shooting magnification $\beta$ are represented as follows, respectively.

$$R = \sum_{i=1}^{n} R_i \quad (19)$$

$$= \sum_{i=1}^{n} \{FF_i' - f_i(\beta_i + 1/\beta_i)\}$$

$$\beta = \prod_{n=i}^{n} \beta_i \, (\beta_i \neq 0) \quad (20)$$

$$\beta_i = S_i'/S_i \quad (21)$$

When the object point $O_1$ is moved by an amount $\Delta S_i$ to the point $O_2$, the image point $O_1'$ is defocused to $O_2'$ by an amount $\Delta Bf$. In this case, the following relation exists in the i-th lens group $$\Delta S_i = \frac{\Delta S_i'}{\beta_i^2(1 - \Delta S_i'/\beta_i f_i)} \quad (22)$$

where, $\Delta S_n' = \Delta Bf$ and $\Delta S_i' = \Delta S_{i+1}$

All the lens groups are moved by $\Delta X_i$ in order to reduce the defocus amount to 0, so that the image point is moved from $O_2'$ to $O_3'$ and the image is formed on the predetermined image plane I (film surface). The amount of deviation of the object point and the amount of deviation of the image point will be considered on the basis of the correspondence between the conjugate relation of the points $O_3$ and $O_3'$ and the conjugate relation of the points $O_4$ and $O_4'$.

It is possible to determine the relationship between the points $O_3$, $O_3'$ and the points $O_1$, $O_1'$ simply by the following substitutions:

$$\Delta s_i' = \Delta s_{i+1}$$

$$\Delta S_i = \Delta s_i + \Delta x_i$$

$$\Delta S_i' = \Delta x_i + \Delta s_{i+1}$$

$$\Delta S_1 = \Delta s_1$$

$$\Delta s_{n+1} = 0$$

Thus, the formula (22) can be transformed as follows to determine the relationship for each lens group.

$$\Delta s_i = \frac{\Delta x_i + \Delta s_{i+1}}{\beta_i^2 \left(1 - \frac{(\Delta x_i + \Delta s_{i+1})}{\beta_i f_i}\right)} - \Delta x_i \qquad (23)$$

The defocus amount $\Delta Bf$ ($=\Delta S_n'$) is determined in accordance with the formula (23) for successive lens groups starting with the n-th group, and the value $\Delta S_1$ is determined by solving the formula (23) down to $i=1$. At the same time, the value $\Delta s_n$ is determined in accordance with the formula (23) for successive lens groups starting with the n-th group down to $i=1$, thus determining the value $\Delta s_1$. Since the condition of $\Delta S_1 = \Delta s_1$ is met, $\Delta S_1$ and $\Delta s_1$ are eliminated, whereby the relationship between $\Delta Bf$ and $\Delta x_i$ is derived. It is thus possible to determine the amount of movement $\Delta x_i$ from the defocus amount $\Delta Bf$ detected by the focus detection device.

The following relationship exists because the defocus amount $\Delta Bf$ is given as a function of the moving amounts $\Delta x_i$ of the lens groups necessary for the focusing.

$$Q(\Delta x_1, \Delta x_2, \ldots, \Delta x_n) = \Delta Bf \qquad (24)$$

The formulae (22), (23) and (24) are always valid when the amount $\Delta S_i$ is sufficiently large so that the aberration is comparatively small, and show the relationships between two different conjugate points. These conjugate points can be exactly coupled by the driving of each lens system by amount $\Delta x_i$.

It is assumed here that the values of $\Delta s_i$, $\Delta S_i$, $\Delta Bf$ and $\Delta x_i$ are very small so that they can be expressed by $ds_i$, $dS_i$, $dBf$ and $dx_i$, respectively. In such a case, the formulae (22), (23) and (24) can be transformed as follows.

Namely, the formula (22) is transformed into the following formula (25).

$$dS_i = dS_{i+1}/\beta_i^2 \qquad (25)$$

The formula (13) can be rewritten as follows:

$$ds_i = \frac{ds_{i+1} + dx_i}{\beta_i^2} - dx_i \qquad (26)$$

The formulae (25) and (26) are solved for successive lens groups from the n-th group to the first group, so as to determine $ds_i$ and $dS_i$, and elimination is conducted by using the relation of $ds_i = dS_i$, whereby the formula (24) exists as follows in the region near the focusing position.

$$\frac{dBf}{\prod\limits_{L=1}^{n} \beta_L^2} = \sum_{i=1}^{n} \frac{dx_i \left[\frac{1}{\beta_i^2} - 1\right]}{\left[\prod\limits_{k=1}^{i} \beta^2_k - 1\right]} \qquad (27)$$

where $\beta_0 = 1$ and $\beta_i \neq 0$.

(c) Image Plane Movement coefficient and Coupling Constants

A concept of image plane movement coefficient as a physical value and coupling coefficients for amounts of movements of lens groups are defined as follows.

When the lens system is constituted by n lens groups as shown in FIG. 10, the image point $O_2'$ is moved by an amount $\Delta Bf$ with respect to the point $O_1'$, in response to the movement of the object point from the initial focused position, i.e., from conjugate positions $O_1$, $O_1'$. All the lens groups G1, G2, G3, ..., Gn are simultaneously moved so as to focus to obtain a conjugate relationship $O_3$, $O_3'$. Representing the moving amount of a principal lens group (i-th group) by $\Delta x_i$, a mean image plane movement coefficient $Y_{si}$ is defined as follows $$\gamma_{si} = \Delta Bf/\Delta x_i \qquad (28)$$

Similarly, on condition that the amount $dBf$ of movement of the image plane is very small with respect to the amounts $ds_1$, $dS_1$ of movement of the object points, the image plane movement coefficient in the region near the focusing point (referred to as differentiated image plane movement coefficient) when the i-th group is moved by a small amount $dx_i$ is defined as follows.

$$\gamma_i = \lim_{\Delta x_i \to 0} \frac{\Delta Bf}{\Delta x_i} = \frac{dBf}{dx_i} \qquad (29)$$

It is assumed here that, as shown in FIG. 10, the lens groups other than the principal lens group make linear movements in response to the moving amount $\Delta x_i$ of the primary lens group, in a specific shooting region. The ratio of the moving amount $\Delta x_j$ of the j-th lens group to the moving amount $\Delta x_i$ of the i-th lens group is defined as absolute coupling constant $K_{ij}$. Thus, the absolute coupling constant $K_{ij}$ is given by the following formula.

$$K_{ij} = \Delta x_j/\Delta x_i \qquad (30)$$

On the other hand, the ratio of the changing amount $\Delta D_j$ of the space on the image-side of the j-th lens group to the that $\Delta D_i$ of the i-th lens group is defined as relative coupling constant $C_{ij}$. Thus, the absolute coupling constant $C_{ij}$ is given by the following formula.

$$C_{ij} = \Delta D_j/\Delta D_i \qquad (31)$$

The amounts $\Delta x_i$ and $\Delta D_i$ are related to each other through these coupling constants.

$$\Delta x_i = \sum_{j=i}^{n} \Delta D_j = \sum_{j=i}^{n} C_{Lj} \cdot \Delta D_L \qquad (32)$$

$(1 \leq i \leq l \leq j \leq n)$ $$C_{ij} = 1/C_{ji}, \; C_{ii} = 1, \; C_{ij} = C_{ik} \cdot C_{kj} \qquad (33)$$

$$K_{ij} = \frac{\left[\sum\limits_{m=j}^{n} C_{Lm}\right]}{\left[\sum\limits_{s=i}^{n} C_{rs}\right]} \cdot C_{rL} \qquad (34)$$

$$\Delta TL = \Delta x_1, \; \Delta D_n = \Delta x_n \qquad (35)$$

where, $\Delta TL$ represents the amount of change in the length of the whole lens system caused by the focusing operation.

Using these coupling constants, the formula (29) is calculated for the simultaneous focusing operation of all of the n lens groups. The formula (27) is solved as follows.

$$\gamma_i = \frac{dBf}{dx_i} = \left[\prod_{j=1}^{n} \beta_j^2\right] \times \qquad (36)$$

$$\left\{\sum_{j=1}^{n} K_{ij}\left[\frac{1}{\beta_j^2} - 1\right] \bigg/ \left[\prod_{k=1}^{i} \beta_{k-1}^2\right]\right\}$$

In a specific case where only the i-th lens group is movable for the focusing purpose, conditions of $K_{ij}=1$ and $i \geq 1$ are met, so that the formula (36) can be reformed as follows.

$$\gamma_i = (1 - \beta_i^2) \prod_{j=i+1}^{n} \beta_j^2 \qquad (37)$$

$$\gamma_i = (1 - \beta_i^2) \prod_{j=i+1}^{n-2} \beta_j^2 \cdot \left[\frac{f_n^2}{f_{n-1}}\right] \qquad (38)$$

The formula (37) applies to the case where $i > 1$ and where no afocal system ($\beta=0$) is included, while the formula (3) applies to the case where an afocal system is included between the (n−1)th lens group and the n-th lens group.

In the case of a lens system in which the focusing is performed by the movement of the first lens group adjacent to the object point, e.g., a zoom lens, the suffix i is always 1. Therefore, the formulae (37) and (38) apply also to this type of lens system, on condition of $\beta_1=0$ when focused on infinite distance point. On the other hand, the formulae (37) and (38) coincide with each other on condition of $n=1$. Thus, the formula (37) expresses the condition for focusing in all types of focusing systems including, for instance, inner focus type system and rear focus type system.

(d) In Case of Two Group System

The formula (24) is a rather formal expression, so that a lens system constituted by two lens groups and adopting close point correction system will be discussed as a practical example.

Solutions are obtained as follows for successive formulae starting with the formula (22).

$$\Delta S_1 = \frac{\Delta Bf}{\beta_1^2 \cdot \beta_2^2 \left(1 - \Delta Bf \left[\frac{1}{f_1 \beta_1 \beta_2^2} + \frac{1}{f_2 \beta_2}\right]\right)} \qquad (39)$$

A small-magnification approximation is made as follows, in accordance with the formula (23).

$$|\Delta x_2/f_2| << |(1-\beta_2^2)/\beta_2|$$

In this case, since the condition of $\Delta s_i = \Delta S_i$ is met, the following formula (40) is derived.

$$\Delta S_1 = \frac{\Delta x_1(1-\beta_1^2)\beta_2^2 + \Delta x_2(1-\beta_2^2) - \Delta x_1 \Delta x_2 (\beta_1/f_1 + \beta_2/f_2)(1-\beta_2^2) + \Delta x_1 \beta_1 \beta_2^2/f_1}{\beta_1^2 \beta_2^2 \left\{1 - \frac{\Delta x_1}{f_1 \beta_1} - \Delta x_2 \left[\frac{1}{f_2 \beta_2} + \frac{1-\beta_2^2}{f_1 \beta_1 \beta_2^2}\right]\right\}} \qquad (40)$$

Assuming here that the terms other than $\Delta x_1(1-\beta_1^2)\beta_2^2 + \Delta x_2(1-\beta_2^2)$ in the numerator of the formula (4) are negligible, i.e., that the values of $\Delta x_1/f_1$ and $\Delta x_2/f_2$ are not so large, the formula (40) can be rewritten as follows.

$$\Delta S_1 \simeq \frac{\Delta x_2 [K_{21}(1-\beta_1^2)\beta_2^2 + (1-\beta_2^2)]}{\beta_1^2 \beta_2^2 \left\{1 - \Delta x_2 \left[\frac{1}{f_1 \beta_1 \beta_2^2} + \frac{1}{f_2 \beta_2} + (K_{21}-1)\frac{1}{f_1 \beta_1}\right]\right\}} \qquad (41)$$

$$\gamma_2 = K_{21}(1-\beta_1^2) \cdot \beta_2^2 + (1-\beta_2^2) \quad \gamma_1 = (1-\beta_1^2)\beta_2^2 + K_{12}(1-\beta_2^2) \qquad (42)$$

Since the formula (39) and the formula (40) are equivalent, the following formula is obtained.

$$\Delta x_2 = \frac{\Delta Bf}{\gamma_2} \cdot \frac{1}{1 - \Delta Bf \left\{\left(\frac{1}{f_1 \beta_1 \beta_2^2} + \frac{1}{f_2 \beta_2}\right) - \gamma_2 \left[\frac{1}{f_1 \beta_1 \beta_2^2} + (K_{21}-1)\frac{1}{f_1 \beta_1}\right]\right\}} \qquad (43)$$

It is also easy to solve the formulae (39) and (40) to determine the value of $\Delta x_1$.

On condition of $\Delta x_1 = 0$ and $K_{z1} = 0$, $Y_2$ is expressed by $Y_2 = 1 - \beta_2^2$, so that the formula (43) can be transformed into the following formula (44)

$$\Delta x_2 = \frac{\Delta Bf}{\gamma_2} \cdot \frac{1}{(1 + \Delta Bf \beta_2/\gamma_2 f_2)} \qquad (44)$$

The formula (44) is the same as the formula (17).

In the case of a lens system in which the focusing is effected by the movement of the first lens group solely, the condition of $Y_1 = (1-\beta_1^2)\beta_2^2$ is met, so that the amount $\Delta x_1$ is derived as follows from the formulae (39) and (40).

$$\Delta x_1 = \frac{\Delta Bf}{\gamma_1} \cdot \frac{1}{\{1 - \Delta Bf(1/f_2\beta_2 - \beta_1/\gamma_1 f_1)\}} \qquad (45)$$

This type of the lens system is, for example, a zoom lens system in which the focusing operation is performed by moving the first lens group. Symbols $\beta_2$ and $f_2$ represent, respectively, the zoom magnification and the focal distance of the zooming portion.

As will be seen from the formula (45), the effect of the term $\beta_1/Y_1 f_1$ is small when the magnification $\beta_1$ is as small as 1/10 due to focusing, so that the value $1/l_1$ $(1/f_2\beta_2 - \beta_1/Y_1 f_1)$ can be regarded as being materially constant. By setting the values of $Y_1$ and $l_1$ for each shooting region, it is possible to easily calculate the amount $\Delta x_1$ from the defocus amount $\Delta Bf$, so that the focusing operation can be controlled highly precisely.

(e) Conclusion Concerning Multi-group system

Although the theoretical analysis has been made specifically with reference to a lens system having two lens groups, it will be clear that the described principle can apply to the control of the automatic focusing operation in other ordinary multi-group lens systems, in accordance with the following formula (46) which will be obvious from the formula (43).

$$\Delta x_i = \frac{\Delta Bf}{\gamma_i} \cdot \frac{1}{\left[1 - \frac{\Delta Bf}{l_i}\right]} \quad (46)$$

The control in accordance with the formula (46) can provide a higher degree of precision of the automatic focus control than the conventional system which relies upon the condition of $\Delta x_i = \Delta Bf/Y_i$, even if the defocus amount $\Delta Bf$ is large to some extent. Thus, the focusing device in accordance with the invention makes it possible to provide a high degree of focusing precision with reduced number of cycles of the focusing operation.

What is claimed is:

1. A camera comprising:
   (a) a photographing lens for forming an image of an object, said photographing lens having at least one lens component which is movable to form the image of the object;
   (b) detecting means for detecting an amount of defocus of the image of the object formed by said photographing lens from a predetermined plane and for producing a defocus signal which indicates the detected amount of defocus;
   (c) memory means in which a conversion coefficient and a correction coefficient are stored fixedly;
   (d) motor means for moving said at least one lens component;
   (e) calculating means for determining a corrected conversion coefficient on the basis of the conversion coefficient stored in said memory means and both said detected amount of defocus conforming to said defocus signal and said correction coefficient stored in said memory means, and also for conducting a calculation of a driving amount of said motor means on the basis of the corrected conversion coefficient and the detected amount of defocus, said calculating means producing a driving signal which indicates said driving amount of said motor means; and
   (f) control means responsive to said driving signal for causing said motor means to drive by said driving amount indicated by said driving signal.

2. A camera according to claim 1, wherein said calculating means determines the corrected conversion coefficient in accordance with the following formula:

$$K = KO(CO \cdot \Delta Bf + 1)$$

where KO is said conversion coefficient, CO is said correction coefficient, $\Delta Bf$ is said detected amount of defocus and K is said corrected conversion coefficient.

3. A camera according to claim 2, wherein said calculating means conducts the calculation converting said detected amount of defocus into said driving amount in accordance with the following formula:

$$\Delta x = 1/K \cdot \Delta Bf$$

where $\Delta x$ is said driving amount.

4. A camera according to claim 3, wherein said conversion coefficient is determined in accordance with the following formula:

$$K0 = \lim_{\Delta x \to 0} \frac{\Delta Bf}{\Delta x}$$

5. A camera according to claim 1, wherein said calculating means conducts the calculation converting said detected amount of defocus into said driving amount in accordance with the following formula:

$$\Delta x = 1/K \cdot \Delta Bf$$

where $\Delta x$ is said driving amount, K is said corrected conversion coefficient and $\Delta Bf$ is said detected amount of defocus.

6. A camera comprising:
   (a) a photographing lens for forming an image of an object, said photographing lens having at least one lens component which is movable to form the image of the object;
   (b) detecting means for detecting an amount of defocus of the image of the object formed by said photographing lens from a predetermined plane and for producing a defocus signal which indicates said detected amount of defocus;
   (c) memory means in which a conversion coefficient and a correction coefficient are stored fixedly, said conversion coefficient having one value and said correction coefficient having a plurality of values;
   (d) motor means for moving said at least one lens component;
   (e) calculating means for determining a corrected conversion coefficient on the basis of the value of said conversion coefficient stored in said memory means and both the detected amount of defocus conforming to said defocus signal and one of said plurality of values of said correction coefficient stored in said memory means, and also for conducting a calculation of a driving amount of said motor means on the basis of the corrected conversion coefficient and the detected amount of defocus, said calculating means producing a driving signal which indicates said driving amount of said motor means; and
   (f) control means responsive to said driving signal for causing said motor means to drive by said driving amount indicated by said driving signal.

7. A camera according to claim 6, wherein said calculating means is adapted for determining the corrected conversion coefficient K from said defocus amount $\Delta Bf$, said conversion coefficient Ko and said values $Co_1, Co_2, \ldots, Co_i, \ldots, Co_D$ of correction coefficient in accordance with the following formula:

$$K = Ko\left[1 + \sum_{i=1}^{D} (Co_i \cdot \Delta Bf^i)\right]$$

8. A camera according to claim 7, wherein said calculating means conducts the calculation said detected amount of defocus into said driving amount in accordance with the following formula:

$$\Delta x = 1/K \cdot \Delta Bf$$

where $\Delta x$ is said driving amount.

9. A photographing lens adapted to be mounted on a camera body and having detecting means for detecting an amount of defocus of the image of the object from a predetermined plane, calculation means for conducting a calculation in accordance with an output from said detecting means, and lens driving means operative in accordance with the result of the calculation conducted by said calculation means, said photographing lens comprising:
- (a) an optical system for forming an image of an object, said optical system having at least one lens component which is movable to form the image of the object; and
- (b) memory means in which at least one conversion coefficient and at least one correction coefficient are stored fixedly, said calculation means determining a corrected conversion coefficient on the basis of a conversion coefficient stored in said memory means and both the detected amount of defocus and a correction coefficient stored in said memory means, and also conducting a calculation of a driving amount of said lens driving means on the basis of the corrected conversion coefficient and the detected amount of defocus.

10. A camera comprising:
- (a) a photographing lens for forming an image of an object, said photographing lens having at least one lens component which is movable to form the image of the object, the optical characteristics of said photographing lens being variable;
- (b) first detecting means for detecting an amount of defocus of the image of the object formed by said photographing lens from a predetermined plane and for producing a defocus signal which indicates the detected amount of defocus;
- (c) memory means in which a conversion coefficient and a correction coefficient are stored fixedly, said conversion coefficient having a plurality of values and said correction coefficient having a plurality of values;
- (d) second detecting means for detecting a change in the optical characteristics of said photographing lens and for producing an optical detection signal;
- (e) selecting means for selecting one of said plurality values of said conversion coefficient and one of said plurality values of said correction coefficient in response to said optical detection signal;
- (f) motor means for moving said at least one lens component;
- (g) calculating means for correcting the selected one of said plurality of values of said conversion coefficient on the basis of the detected amount of defocus conforming to said defocus signal and the selected one of said plurality of values of said correction coefficient, and for conducting a calculation for converting said detected amount of defocus into a driving amount of said motor means on the basis of the corrected one of said plurality of values of said conversion coefficient, said calculating means producing a driving signal which indicates said driving amount of said motor means; and
- (h) control means responsive to said driving signal for causing said motor means to drive by said driving amount indicated by said driving signal.

11. A camera according to claim 10, wherein a plurality of conversion coefficient values $Ko_1, Ko_2, \ldots, Ko_i, \ldots, Ko_p$ are given and a plurality of correction coefficient values $Co_1, Co_2, \ldots, Co_i, Co_q$ are given, the numbers of said values are both N so that N combinations of values $(Ko_1, Co_1), \ldots (Ko_i, Co_i), \ldots (Ko_N, Co_N)$ are formed.

12. A camera according to claim 11, wherein said calculating means is adapted for determining the corrected conversion coefficient K from said defocus amount $\Delta Bf$, said conversion coefficient $Ko_i$ and said correction coefficient $Co_i$ in accordance with the following formula:

$$K = Ko_i(Co_i \cdot \Delta Bf + 1)$$

13. A camera according to claim 12, wherein said lens has a construction capable of changing its power arrangement, said camera further comprising means for selecting one of said combinations $(Ko_i, Co_i)$ in accordance with a change in said power arrangement.

14. A camera according to claim 12, wherein said lens has a construction capable of changing its focal distance, said camera further comprising means for selecting one of said combinations $(Ko_i, Co_i)$ in accordance with a change in said focal distance.

15. A camera according to claim 14, wherein said photographing lens is of the type having a variable focal distance and said second detecting means is an encoder responsive to the change in the focal distance of said photographing lens.

16. A camera according to claim 14, wherein said photographing lens is a macro lens and has a focus ring, and wherein said second detecting means is an encoder responsive to the operation of said focus ring.

17. A camera comprising:
- (a) a photographing lens for forming an image of an object, said photographing lens having at least one lens component which is movable to form the image of the object;
- (b) detecting means for detecting an amount of defocus of the image of the object formed by said photographing lens from a predetermined plane and for producing a defocus signal which indicates the detected amount of defocus;
- (c) memory means in which a plurality of coefficients are stored fixedly;
- (d) motor means for moving said at least one lens component;
- (e) calculating means responsive to said detected amount of defocus and said plurality of coefficients stored in said memory means for calculating a driving amount of said motor means so that the calculated driving amount changes non-linearly with respect to the detected amount of defocus, said calculating means producing a driving signal which indicates said driving amount of said motor means; and
- (f) control means responsive to said driving signal for causing said motor means to drive by said driving amount indicated by said driving signal.

* * * * *

Adverse Decisions in Interference

Patent No. 4,841,325, Kunihisa Hoshino, (deceased), Chie Hoshino, Yoshinari Hamanishi, Ken Utagawa, AUTOMATIC FOCUSING DEVICE FOR CAMERA, Interference No. 103,208, final judgment adverse to the patentee rendered September 30, 1998, as to claims 1-14.
*(Official Gazette June 8, 1999)*